(12) United States Patent
Potaraju et al.

(10) Patent No.: US 12,011,861 B2
(45) Date of Patent: Jun. 18, 2024

(54) METHOD AND SYSTEM FOR IMPROVING THE PRODUCTION OF A CASED DEVICE

(71) Applicant: COVESTRO INTELLECTUAL PROPERTY GMBH & CO. KG, Leverkusen (DE)

(72) Inventors: Sairam Potaraju, Leverkusen (DE); Reinhard Albers, Leverkusen (DE); Andreas Lyding, Duisburg (DE); Michael Loof, Leverkusen (DE)

(73) Assignee: COVESTRO INTELLECTUAL PROPERTY GMBH & CO. KG, Leverkusen (DE)

( * ) Notice: Subject to any disclaimer, the term of this patent is extended or adjusted under 35 U.S.C. 154(b) by 518 days.

(21) Appl. No.: 17/284,490

(22) PCT Filed: Oct. 11, 2019

(86) PCT No.: PCT/EP2019/077552
§ 371 (c)(1),
(2) Date: Apr. 12, 2021

(87) PCT Pub. No.: WO2020/074680
PCT Pub. Date: Apr. 16, 2020

(65) Prior Publication Data
US 2021/0339445 A1 Nov. 4, 2021

(30) Foreign Application Priority Data

Oct. 12, 2018 (EP) ...................................... 18200231

(51) Int. Cl.
*G05B 13/04* (2006.01)
*B29C 44/18* (2006.01)
(Continued)

(52) U.S. Cl.
CPC ............ *B29C 45/766* (2013.01); *B29C 44/18* (2013.01); *B29C 44/60* (2013.01); *G05B 13/04* (2013.01);
(Continued)

(58) Field of Classification Search
None
See application file for complete search history.

(56) References Cited

U.S. PATENT DOCUMENTS 5,958,991 A * 9/1999 Bartlett, Jr. ........... B29B 7/7404
521/131
6,060,004 A * 5/2000 Takeuchi ............ B29C 45/1642
264/328.8

(Continued)

FOREIGN PATENT DOCUMENTS

| DE | 102006057772 A1 | 6/2008 |
| EP | 1615152 A1 | 1/2006 |
| KR | 10-2015-0049921 A | 5/2015 |

OTHER PUBLICATIONS

Nagorny et al., "Quality Prediction in Injection Molding", 2017, 2017 IEEE International Conference on Computational Intelligence and Virtual Environments for Measurement Systems and Applications, pp. 1-6 (Year: 2017).*

(Continued)

*Primary Examiner* — Jason Lin
(74) *Attorney, Agent, or Firm* — K&L Gates LLP

(57) ABSTRACT

A method for improving the production of a cased device (1), wherein a casing component (2) of the cased device (1) is produced, which production of the casing component (2) comprises injecting a polymer mixture (4) for creating a solid foam interior into a cavity, which cavity is formed by the casing component (2), which injecting is done by an injection apparatus (3) and which injecting is based on injection control data (5) input to the injection apparatus (3), (Continued)

wherein during the injection of the polymer mixture (4) into the cavity forming data (6) for describing the injection process is recorded, wherein after injecting the polymer mixture (4) into the cavity at least one image of the casing component (2) is recorded and wherein based on the forming data (6), the at least one image and the injection control data (5) a prediction model (8) for generating new injection control data (10) for inputting to the injection apparatus (3) is updated.

14 Claims, 1 Drawing Sheet

(51) Int. Cl.
- *B29C 44/60* (2006.01)
- *B29C 45/76* (2006.01)
- *B29K 75/00* (2006.01)
- *B29K 105/04* (2006.01)
- *B29L 31/00* (2006.01)

(52) U.S. Cl.
CPC ............... *B29C 2945/76461* (2013.01); *B29C 2945/76936* (2013.01); *B29K 2075/00* (2013.01); *B29K 2105/04* (2013.01); *B29K 2995/0015* (2013.01); *B29L 2031/762* (2013.01)

(56) References Cited

U.S. PATENT DOCUMENTS

| | | | | |
|---|---|---|---|---|
| 10,830,527 | B2* | 11/2020 | Deka | F16L 59/065 |
| 2004/0059452 | A1 | 3/2004 | Kachnic et al. | |
| 2004/0065973 | A1* | 4/2004 | Ehbing | B29C 44/60 425/4 C |
| 2006/0012064 | A1* | 1/2006 | Hutson | B29C 45/768 264/334 |
| 2008/0258324 | A1* | 10/2008 | Tanaka | B29C 44/3403 264/40.5 |
| 2008/0284051 | A1* | 11/2008 | Corradi | B29C 44/42 264/51 |
| 2011/0221085 | A1* | 9/2011 | Fiorentini | B29B 7/7404 264/46.6 |
| 2015/0102716 | A1 | 4/2015 | Cook | |
| 2016/0274561 | A1 | 9/2016 | Stone | |
| 2017/0031330 | A1* | 2/2017 | Shiraishi | G06N 7/01 |
| 2017/0095952 | A1* | 4/2017 | Arnauts | B29C 44/186 |

OTHER PUBLICATIONS

International Preliminary Report on Patentability received for PCT Patent Application No. PCT/EP2019/077552, mailed on Apr. 22, 2021, 8 pages.

International Search Report and Written Opinion received for PCT Patent Application No. PCT/EP2019/077552, mailed on Dec. 17, 2019, 9 pages.

* cited by examiner

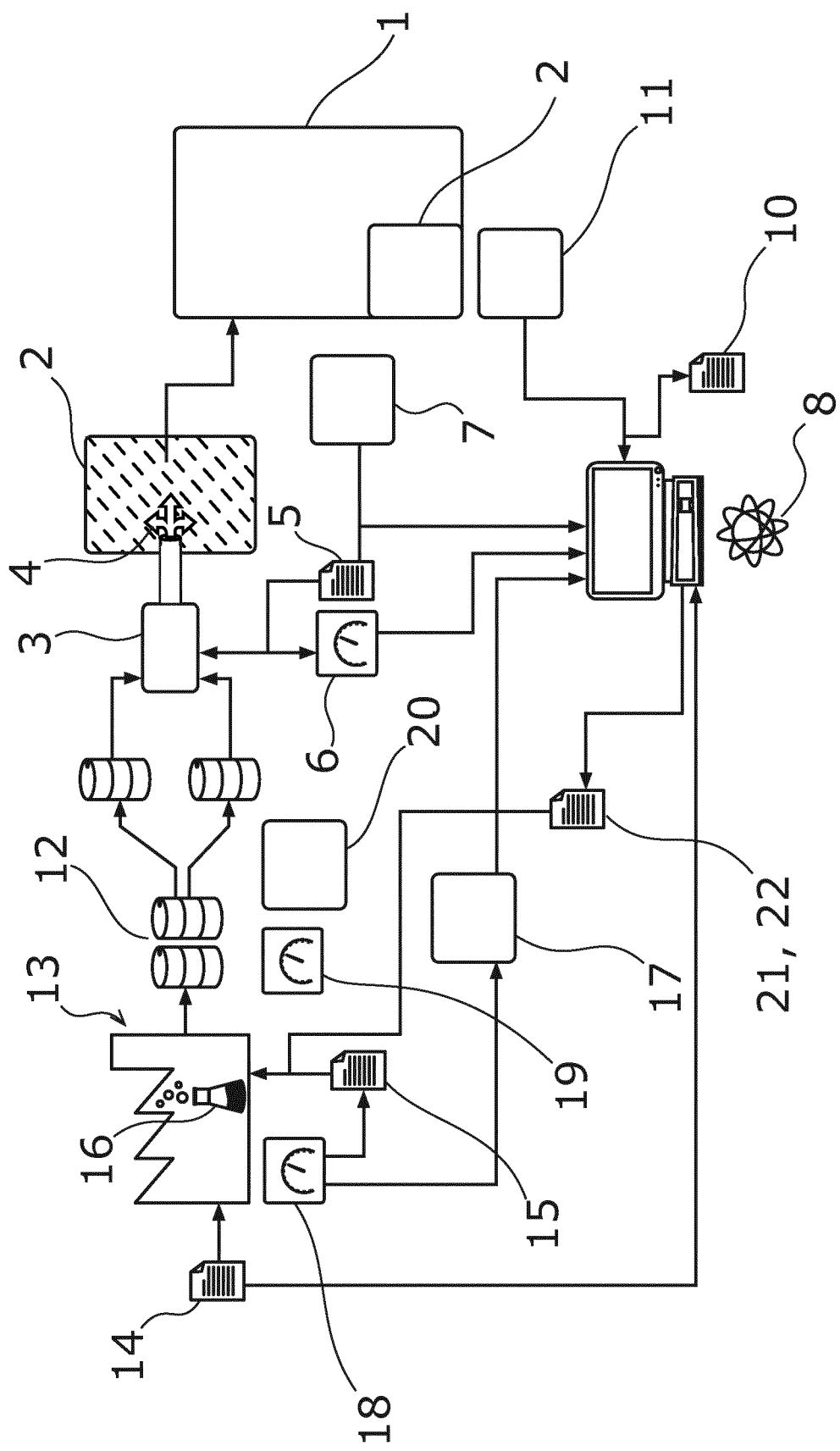

METHOD AND SYSTEM FOR IMPROVING THE PRODUCTION OF A CASED DEVICE

CROSS-REFERENCE TO RELATED APPLICATIONS

This application is a national stage application (under 35 U.S.C. § 371) of PCT/EP2019/077552, filed Oct. 11, 2019, which claims benefit of European Application No. 18200231.1, filed Oct. 12, 2018, both of which are incorporated herein by reference in their entirety.

The invention is directed at a method for improving the production of a cased device.

One example of such cased devices or devices with a case are home appliances. Home appliances and in particular refrigerators comprise casing components which serve both to provide mechanical stability and also temperature isolation. Such casing components are regularly produced by foam injection molding into the appropriate cavity formed by the casing component. In particular, the cavity may be formed by a shell of the casing component. For example, the shell may be a shell of a door or of a cabinet wall of the home appliance. A common sort of product defect for such products can result from uneven or incomplete distribution of the foam within the cavity.

Such irregularities in foam distribution may lead to an irregular force or strain load on the casing component, which in can turn lead to deformations or deviations from the desired shape or curvature of the casing component, even though the outer shell itself may conform to the specification. Moreover, such irregular foam distribution within the shell may not immediately result in a deformation of the casing component, but only after some time. If the deformation occurs only after several days or weeks, the defect will not be detected by a visual inspection of the cased device as it leaves the production line or factory, but will only be noticeable when at the point of sale or after delivery to the customer. Further, even if the irregular foam distribution is detected during production, e.g. by means of an infrared scan, so far the option has only been to either accept the casing component as nonetheless being within specifications or to reject it as scrap. Yet so far the problem of how to reduce the incidence of scrap due to the foam injection process and to improve the efficiency of this process has been inadequately addressed.

KR 2015 0049921 A from the prior art discloses a continuous foam molding facility to execute manufacturing processes of a synthetic resin foaming and molding product all at once, wherein a number of molds are mounted in a transfer device such as a conveyor, a turntable, or the like, and a heating device such as an injecting device, a molding and demolding device. Non-contact temperature measurement can be realized by an optical thermometer by applying matte paint to the surface of a mold made of aluminum.

US 2017/0031330 A1 discloses an injection molding system including a state observation section observing, when injection molding is performed, physical-amounts relating to the injection molding that is being performed; a physical-amount data storage section storing the physical-amount data; a reward-conditions setting section setting reward condition for machine learning; a reward calculation section calculating a reward based on the physical-amount data and the reward conditions; an operating-conditions adjustment learning section performing machine learning of adjusting operating conditions based on the reward calculated by the reward calculation section, the operating conditions and the physical-amount data.

EP 1 615 152 A1 discloses a finite element method to analyze a foaming flow behavior of the foaming material by obtaining a flow velocity and a pressure by inputting the density as a function including a term of the elapsed time from the passage through an injection port to the foaming die and the thickness term and substituting a density calculated at a time in an equation of continuity and an equation of motion.

DE 10 2006 057772 A1 discloses a device with a container filled with a liquid dispersion. A gas supply is induced for generating foam from the liquid dispersion and gas is controlled in the liquid dispersion. A unit is provided for determining the level of the produced foam. Two electrodes are provided for time resolved detection of the conductivity of the produced foam. A video camera is provided for detecting the lamella size of the produced foam.

US 2016/0274561 A1 discloses a method of controlling a manufacturing process having a machine to form a material into a component. The method comprises the steps of establishing an initial set of operating parameters for the machine, producing an initial component from the machine, inspecting the component to determine its acceptability relative to a desired component, determining a variation in the operating parameters to improve the acceptability of the component, effecting changes in the operating parameters and inspecting subsequent components to determine their acceptability.

US 2004/0059452 A1 discloses a wireless image processing method and device for utilization in combination with a machine vision system, wherein a wireless communicator delivers images to a host computer that can analyze the data and determine functionality to the manufacturing process.

US 2015/0102716 A1, which is considered the closest prior art, discloses a method for manufacturing a refrigerator appliance. The method includes applying a polyurethane elastomer onto a surface of an inner liner of the refrigerator appliance and injecting a polyurethane foam into a cavity defined between an outer case of the refrigerator appliance and the inner liner.

Therefore, the object of the invention is to provide a method for improving the production of a cased device such that rejection of casing components or entire cased devices can be successively reduced and the yield and efficiency of the production process successively increased.

With respect to a method for improving the production of a cased device, the object of the invention is achieved through a method for improving the production of a cased device according to claim 1.

The invention is based on the recognition that in addition to the visual or thermographic inspection data of the casing component, additional data relating to the foam injection molding process itself can be used and correlated to obtain updated injection control data to improve the production process. In this way, the imaging of the casing component and analysis of the solid foam created within the casing component of the cased device is not just used to determine whether the casing component is still within specifications, but also to provide the basis for a feedback to the injection control data underlying the foam injection molding process. Thus, the process itself can be improved the more imaging data there is.

The method according to the invention is for improving the production of a cased device. A cased device in the sense of the present invention is any device which comprises a casing. Preferably the casing of the device presents an outer casing. The casing may also be only a part of the outer enclosure of the cased device. In the method according to the invention, a casing component of the cased device is produced. The casing component of the cased device may be any component of the cased device in which an interior foam is arranged within a cavity formed by the casing component. In the method according to the invention, the casing component comprises a shell which forms the cavity. The shell may be formed by any rigid material including metal and plastic. The shell may be assembled from several shell components.

In the method of the invention, said production of the casing component comprises injecting a polymer mixture for creating a solid foam interior into a cavity, which cavity is formed by the shell of the casing component, which injecting is done by an injection apparatus. According to the invention, said injecting is based on injection control data input to the injection apparatus. Said injecting corresponds to the well-known reaction injection molding process also known as foam injection molding. The injection control data may fully or partially, directly or indirectly determine the operation of the injection apparatus as it executes the injection of the polymer mixture and also other steps of the foam injection molding.

In the method according to the invention, during the injection of the polymer mixture into the cavity, forming data for describing the injection process is recorded. Such forming data may in principle be any kind of data recorded during or immediately after the injection process which is related to the foam injection molding process. Further in the method according to the invention, after injecting the polymer mixture into the cavity, at least one image of the casing component is recorded. The at least one image may cover the entire casing component or only a part thereof. Moreover, each of the at least one images may in itself be an image series or a video.

In the method according to the invention, based on the forming data, the at least one image and the injection control data, a prediction model for generating new injection control data for inputting to the injection apparatus is updated. In other words, the prediction model is configured for generating new injection control data, which can subsequently be input to the injection apparatus, based on input provided to the prediction model, which in principle may be any kind of data. The forming data, the at least one image and the injection control data are now used to update or adapt the prediction model and therefore how it generates new injection control data. This new injection control data can then be used for an injection of the polymer mixture which is subsequent to the injection for which the associated injection control data is used to update the prediction model.

Preferably, the casing component is assembled with cased device components—in other words other components of the cased device—to form the assembled cased device after the recording of the thermographic image.

The at least one image may in principle comprise any kind of image data.

In a preferred embodiment of the method, the at least one image comprises a visual inspection of the casing component for detecting defects of the casing component. In particular, the visual inspection may be within the visible spectrum. In principle, the visual inspection may concern any kind of defects. The visual inspection may concern the entire casing component or only a part of the casing component. It is preferred that the defects here referred to comprise deviations of the casing component from prescribed dimensional specifications. Alternatively or in addition, the defects here referred to may comprise deviations of the casing component from a prescribed surface contour.

It may also be that the visual inspection is recorded after the casing component is assembled to form the assembled cased device. In this case, it is preferred that the visual inspection of the assembled cased device is recorded for detecting defects of the assembled cased device. Preferably, the defects comprise deviations of the assembled cased device from prescribed dimensional specifications and/or deviations of the assembled cased device from a prescribed surface contour.

The recorded visual inspection may comprise a single image. It may also comprise a succession of images or a video. In a further preferred embodiment of the method, the visual inspection comprises a stripe light scan of casing component, preferably of the assembled cased device. It is further preferred that the prediction model is also updated based on the visual inspection. Thus, there is additional input for the improvement of the prediction model, thereby helping to make the prediction model more reliable.

In the method according to the invention, the at least one image comprises a thermographic image for determining a distribution of the solid foam interior in the cavity. The thermographic image may in particular be an infrared image. Preferably, the thermographic image is based on residual heat generated by an exothermic foam creation reaction. In particular, it may be that the distribution of the solid foam interior is determined based on the distribution of the residual heat within the cavity. This approach permits obtaining information about the state within the cavity with a camera that is placed outside the cavity.

It is further preferred that the thermographic image is recorded before the visual inspection is recorded.

In principle, the solid foam interior may be any kind of solid foam and therefore consist of an arbitrary foam material. In particular, the solid foam interior may be a polymer foam interior. In a preferred embodiment, the solid foam interior is a polyurethane foam interior. The solid foam interior may be a thermoplastic polyurethane foam interior or a thermosetting polyurethane foam interior.

Polyurethanes are an important component in major appliances which consumers use every day. The most common use for polyurethanes in major appliances is rigid foams for refrigerator and freezer thermal insulation systems. Rigid polyurethane foam can be a cost-effective material used to meet required energy ratings in consumer refrigerators and freezers. The good thermal insulating properties of rigid polyurethane foams result from the combination of a fine, closed-cell foam structure and cell gases that are poor heat conductors.

The casing component may comprise an outer casing and an inner liner. In particular, the shell may comprise the outer casing and the inner liner. The outer casing may comprise a sheet metal or consist of sheet metal. The inner liner may comprise polystyrene or consist of polystyrene. It is preferred that the cavity is formed between the outer casing and the inner liner. The solid foam interior may act as both a structural and an insulating material. Preferably, the solid foam interior forms an adhesive bond with the casing component. In particular, the solid foam interior may form an adhesive bond with the outer casing and the inner liner. Thus, in addition to thermal insulation the solid foam interior may convey structural stability.

In principle, the component charge of the polymer mixture may be provided from any source and it may also be that there is no information about it other than specifications. However, a preferred embodiment of the method is characterized in that a component charge of the polymer mixture is produced in a precursor production process based on recipe data at a precursor production facility and that during the precursor production process of the component charge precursor production data is recorded. The component charge is a single charge of any component making up the polymer mixture used for the foam injection molding process. The recipe data prescribes the formulation for the component charge, i.e. the specific ingredients and their proportion to be used for producing the component charge. Preferably, the prediction model is also updated based on the precursor production data and/or the recipe data. Thus, this additional data from an upstream production step can also be involved to further improve the prediction model.

A further preferred embodiment of the method is characterized in that the component charge is a polyisocyanate charge or a polyol charge. Polyisocyanate and polyol may react to produce a polyurethane. Thus, the component charge is suitable for forming the solid foam interior with the respective other reactant.

In principle, the precursor production data may be any data measured during the precursor production process and in some way connected to the production of the component charge. According to a preferred embodiment of the method, the precursor production data comprises, in particular user-settable, precursor production settings which are input to a precursor production apparatus for controlling the precursor production process of the component charge. Thus, the precursor production settings directly or indirectly determine the operation of the precursor production apparatus in the precursor production process.

According to a further preferred embodiment of the method, the precursor production data comprises precursor measurement data measured during the precursor production process of the component charge. In principle, this may be any kind of data measured in the context of the precursor production process of the component charge.

A preferred embodiment of the method is characterized in that the component charge of the polymer mixture is stored in precursor storage process and that during the precursor storage process of the component charge, precursor storage data is recorded. Thus, there is information on what the circumstances of storing the precursor charge were. It is further preferred that the prediction model is also updated based on the precursor storage data. The conditions during storage of the component charge as well as the duration of the storage of the component charge may affect the quality of the subsequent foam injection molding in a substantial way, for example by causing a premature deterioration of the component charge.

A further preferred embodiment of the method is characterized in that the prediction model comprises a correlation between correlation variables, which correlation variables comprise the injection control data, the forming data and the at least one image, preferably the thermographic image and/or the visual inspection. In other words, the prediction model provides the ability to numerically, analytically or in any other, potentially approximate way determine one or more of the correlation variables as output of the prediction model based on one or more other correlation variables as input to the prediction model. The prediction model may be a software, a part of a software or a data set, e.g. of parameters, based on which a software operates. The prediction model may be executed by a single computer, by a group of computers or in a distributed or cloud computing environment.

It is preferred that the correlation variables also comprise the the recipe data, the precursor production data, the precursor storage data and/or the charge properties data. In particular, it is preferred that the prediction model is configured for generating new injection control data based on precursor storage data and/or precursor production data and/or precursor production data of the component charge of the polymer mixture which has been input to the prediction model. In this way, it is possible to obtain such injection control data that is advantageous, for example for reducing scrap, improving quality or making the process faster, and has been specifically calculated to take into account the peculiarities of the specific component charge and its product history so far.

In a preferred embodiment of the method, the injection control data for the injection apparatus injecting the polymer mixture is generated by the prediction model based on the precursor storage data and/or the precursor production data and/or the charge properties data of a component charge of the injected polymer mixture. Thus, the generated injection control data is actually applied in the foam injection molding process.

In a further preferred embodiment of the method, the prediction model generates updated recipe data and/or updated precursor production settings based on the correlation variables. In particular, it may be that the updated recipe data and/or the updated precursor production settings provided are to the precursor production facility, in particular to the precursor production apparatus, for the production of a subsequent component charge. Thus the prediction model can not only improve the casing component by tuning the foam injection molding process, but can also provide updates to the upstream precursor production process in order to obtain more suitable component charges.

In principle, the prediction model may be updated based on an arbitrary mechanism. A preferred embodiment of the method is characterized in that updating the prediction model comprises a numerical analysis of the correlation variables.

A further preferred embodiment of the method is characterized in that the injection control data comprises material output data, core temperature, mold temperature, material temperature, dosage pressure, hold time and/or pump output.

According to a preferred embodiment of the method, the forming data comprises ambient data, in particular temperature, air pressure and/or humidity. It is further preferred that the forming data comprises foam leakage data. In particular, the foam leakage data may describe a foam amount that has leaked during the injection process and/or as a result of the injection process.

A preferred embodiment of the method is characterized in that the cased device is a home appliance. In particular, it may be that the cased device is a refrigerator and the casing component is a refrigerator casing component. It is further preferred that the refrigerator casing component is a refrigerator door case or a refrigerator wall case.

Further advantageous and preferred features are discussed in the following description with respect to the FIGURES. In the following it is shown in FIG. 1 a schematic view of a system for carrying out an embodiment of the method according to the invention.

The system shown in FIG. 1 concerns the production process of a cased device 1, which cased device 1 in the present case is a home appliance and in particular a refrigerator. As part of the production of the cased device 1, a casing component 2 of the cased device 1 is produced, which casing component 2 in the present case is a refrigerator door with a shell. In an injection apparatus 3, a polymer mixture 4 is injected into a cavity formed by the shell of the refrigerator door. This injection occurs as part of a foam injection molding process. Thus, a solid form interior within the cavity formed by the shell is formed and the casing component 2 thereby produced. The operation of the injection apparatus 3 is controlled by injection control data 5. During the foam injection molding process, forming data 6 is recorded to provide measurements for describing the injection process.

After the injection process, an image which is a thermographic image 7 is recorded by an infrared camera. Based on the recorded heat distribution, a distribution of the solid foam interior within the cavity of the casing component 2 can be determined. The forming data 6, the thermographic image 7 and the injection control data 5 is provided to an analysis system 9 to update a prediction model 8 implemented as a software application and residing in the analysis system 9, which prediction model 8 configured to generate new injection control data 10 for inputting to the injection apparatus 3. Such new injection control data 10 may in itself be incomplete and for example be modification information with respect to the injection control data 5, which thereby serves as a baseline.

In addition to the thermographic image 7 and after the casing component 2 has been assembled to become the cased device 1, a further image which is here a visual inspection 11 is recorded which involves performing a stripe light scan for detecting deviating surface contours as defects on the cased device 1.

A precursor production facility 13 produces a component charge 12, which here is a polyol charge, of the polymer mixture 4. This production is based on the one hand on recipe data 14 and on precursor production settings 15 which are input to a precursor production apparatus 16 of the precursor production facility 13. During the precursor production process, precursor production measurement data 18 is recorded, which forms precursor production data 17 together with the precursor production settings 15.

Prior to the injection process, the component charge 12 is stored for some time. Precursor storage data 19 describing the precursor storage process, including storage time and ambient variables such as temperature, air pressure and humidity is recorded. Likewise, tests are conducted on the component charge 12 to measure and record charge properties data 20.

The visual inspection 11, the recipe data 14, the precursor storage data 19, the charge properties data 20 and the precursor production data 17 are also provided to the analysis system 6 for updating the prediction model 8 based on the visual inspection 11, the recipe data 14, the precursor storage data 19, the charge properties data 20 and the precursor production data 17.

In particular, by means of numerical analysis the prediction model 8 is updated based on the continuing supply of the different data provided to the analysis system 6. In this way, correlations, dependencies and functional relationships between these correlation values may be identified and the prediction model 8 updated accordingly.

Then, the prediction model 8 may provide new injection control data 10 which particularly suitable for e.g. avoiding defects under particular circumstances. For example, it may be determined by the prediction model 8 with the benefit of the information provided that for a component charge 12 stored under particular circumstances as shown by the precursor storage data 19, new injection control data 10 should be generated to adjust the foam injection molding process so as to avoid an irregular foam distribution. On the other hand, a component charge 12 with slightly different recipe data 14 may require different new injection control data 10 to avoid the same defect. Processing large amounts of the correlation values may help come to such insights e.g. by numerical analysis, which insights are then reflected in the prediction model 8. Beside the new injection control data 10, the prediction model 8 also provides updated recipe data 21 and updated precursor production settings 22, which are both provided to the precursor production facility 13 and in particular the precursor production apparatus 16 in order to improve the precursor production process for a subsequent component charge 12.

The invention claimed is:

1. A method for improving the production of a cased device, comprising producing a casing component of the cased device, wherein the casing component comprises a shell, which production of the casing component comprises injecting a polymer mixture for creating a solid foam interior into a cavity, which cavity is formed by the shell of the casing component, which injecting is done by an injection apparatus and which injecting is based on injection control data input to the injection apparatus, wherein, during the injection of the polymer mixture into the cavity forming data for describing the injection process is recorded, that after injecting the polymer mixture into the cavity at least one image of the casing component is recorded, that the at least one image comprises a thermographic image for determining a distribution of the solid foam interior in the cavity, that based on the forming data, the at least one image and the injection control data a prediction model for generating new injection control data for inputting to the injection apparatus is updated, and that the injection apparatus is controlled based on the new injection control data generated by the updated prediction model.

2. The method according to claim 1, wherein the at least one image comprises a visual inspection for detecting defects of the casing component.

3. The method according to claim 2, wherein, the visual inspection comprises a stripe light scan of the casing component.

4. The method according to claim 1, wherein a component charge of the polymer mixture is produced in a precursor production process based on recipe data at a precursor production facility and that during the precursor production process of the component charge precursor production data is recorded.

5. The method according to claim 4, wherein the precursor production data comprises precursor production settings which are input to a precursor production apparatus for controlling the precursor production process of the component charge.

6. The method according to claim 4, wherein the component charge of the polymer mixture is stored in precursor storage process, that during the precursor storage process of the component charge precursor storage data is recorded.

7. The method according to claim 4, wherein charge properties data is measured from the component charge and that the prediction model is updated based on the charge properties data.

8. The method according to claim 1, wherein the prediction model comprises a correlation between correlation variables, which correlation variables comprise the injection control data, the forming data and the at least one image.

9. The method according to claim 8 wherein the injection control data for the injection apparatus injecting the polymer mixture is generated by the prediction model based on the precursor storage data or the precursor production data or the charge properties data of a component charge of the injected polymer mixture.

10. The method according to claim 8, wherein the prediction model generates updated recipe data or updated precursor production settings based on the correlation variables.

11. The method according to claim 8, wherein updating the prediction model comprises a numerical analysis of the correlation variables.

12. The method according to claim 1, wherein the injection control data comprises material output data, core temperature, mold temperature, material temperature, dosage pressure, hold time and/or pump output.

13. The method according to claim 1, wherein the forming data comprises ambient data, in particular temperature, air pressure and/or humidity, preferably, that the forming data comprises foam leakage data.

14. The method according to claim 1, wherein the device is a home appliance.

* * * * *